United States Patent
Diehl et al.

(10) Patent No.: US 11,254,374 B2
(45) Date of Patent: Feb. 22, 2022

(54) APPARATUS FOR IMPROVING THE AERODYNAMICS ON A COMMERCIAL VEHICLE

(71) Applicant: Magna Exteriors GmbH, Sailauf (DE)

(72) Inventors: Peter Diehl, Kirchheim (DE); Robert Mohr, Weinstadt (DE)

(73) Assignee: MAGNA EXTERIORS GMBH, Sailauf (DE)

( * ) Notice: Subject to any disclaimer, the term of this patent is extended or adjusted under 35 U.S.C. 154(b) by 0 days.

(21) Appl. No.: 16/919,039

(22) Filed: Jul. 1, 2020

(65) Prior Publication Data

US 2021/0001927 A1 Jan. 7, 2021

(30) Foreign Application Priority Data

Jul. 2, 2019 (DE) .......................... 102019209623.9

(51) Int. Cl.
*B62D 35/00* (2006.01)
*B60R 3/00* (2006.01)

(52) U.S. Cl.
CPC ............ *B62D 35/001* (2013.01); *B60R 3/007* (2013.01); *B62D 35/005* (2013.01)

(58) Field of Classification Search
CPC .... B60R 3/007; B62D 35/001; B62D 35/005; B62D 35/008
USPC .......................................... 296/180.1, 180.2
See application file for complete search history.

(56) References Cited

U.S. PATENT DOCUMENTS

| | | | |
|---|---|---|---|
| 3,836,191 A * | 9/1974 | Gotz ..................... | B62D 25/07 296/190.01 |
| 4,653,788 A * | 3/1987 | Di Giusto ............. | B60K 11/08 188/264 A |
| 10,843,747 B2 * | 11/2020 | Tsuchino ............. | B62D 35/001 |
| 2014/0110193 A1 | 4/2014 | Conley et al. | |
| 2015/0015027 A1 * | 1/2015 | Wirth .................. | B62D 35/001 296/180.2 |
| 2019/0152540 A1 * | 5/2019 | Tsuchino ............... | B60R 19/48 |

FOREIGN PATENT DOCUMENTS

| | | | |
|---|---|---|---|
| DE | 2834044 A1 * | 3/1980 | .......... B62D 35/001 |
| DE | 4014577 C1 * | 10/1991 | .......... B62D 35/001 |
| DE | 102004026464 A1 | 9/2005 | |
| DE | 102004035326 A1 | 9/2005 | |
| JP | S57158543 U | 10/1982 | |

(Continued)

OTHER PUBLICATIONS

English translation of KR 20170135436; retrieved via Patent-Translate located at www.epo.org. (Year: 2021).*

(Continued)

*Primary Examiner* — Jason S Daniels
(74) *Attorney, Agent, or Firm* — Dickinson Wright PLLC

(57) ABSTRACT

The invention exhibits an apparatus for improving the aerodynamics of a commercial vehicle having a cab with doors and below-situated footboards for climbing in and out, and having a front panel in which air inlets are present, wherein the air inlets are connected, via air ducts in or on the panel, to the front wheel case of the commercial vehicle and to an air outlet, wherein the at least one footboard of the cab can be folded away and has at least one through-flow region in the vehicle longitudinal direction.

13 Claims, 5 Drawing Sheets

(56) References Cited

FOREIGN PATENT DOCUMENTS

| KR | 20170135436 A | 12/2017 | |
|---|---|---|---|
| WO | WO-2004096625 A2 * | 11/2004 | ........... B62D 35/001 |
| WO | 2017187796 A1 | 11/2017 | |

OTHER PUBLICATIONS

German Search Report from the German Patent Office for related German Application No. 102019209623.9 dated Apr. 4, 2020, 4 pages.
European Search Report from the European Patent Office for related EP Patent Application No. 20181675.8 dated Dec. 1, 2020.

* cited by examiner

APPARATUS FOR IMPROVING THE AERODYNAMICS ON A COMMERCIAL VEHICLE

CROSS-REFERENCE TO RELATED APPLICATIONS

This application claims priority to DE 102019209623.9 filed Jul. 2, 2019. The entire disclosure of the above application is incorporated herein by reference.

FIELD OF THE INVENTION

The invention relates to an apparatus for improving the aerodynamics of a commercial vehicle having a cab with doors and below-situated footboards for climbing in and out, and having a front panel in which air inlets are present, wherein the air inlets are connected, via distribution structures in or on the panel, to the front wheel case of the commercial vehicle and to an air outlet.

BACKGROUND OF THE INVENTION

This section provides information related to the present disclosure which is not necessarily prior art.

For automobiles, and trucks too, of course, it is the case that the lower the cw-value, the lower is also the CO2-emission. An improvement in the cw-value by a measure of 0.01 means, in the test cycle, one gram less of CO2 per kilometre.

However, the aerodynamic options in trucks are restricted. One option for reducing the cw-value consists in minimizing disturbing turbulences in the wheel case, which can be summarized under the heading "air curtain". By this is understood a curtain of air which is formed by slots in the bumper and takes up position in front of or around the front wheel.

From WO 2017/187 796 A1, an apparatus for optimizing the flow for a vehicle is known, wherein the apparatus is capable of reducing the road resistance with a simple structure. The application relates to an apparatus for a vehicle which has a step for climbing in and out, wherein this step is provided beneath a cab door. The apparatus comprises: a first opening section, through which air flows in from the front; a second opening section, which opens towards the vehicle, in order to blow the air introduced from the first opening section into a recessed region, which forms the step for climbing in and out, and/or into a side region, which is located to the outside in a vehicle width direction of the recessed region; and a connecting path, by which the first opening section and the second opening section are linked.

In the case of application for commercial vehicles, there is the problem, however, that the steps or footboards can often not be fitted in set-back regions of the cab, but rather protrude outwards and obstruct the air flow.

JP S57-158 543 U shows a front spoiler having openings which generate an air flow which serves to keep the side region of the vehicle clean.

DE 10 2004 026 464 A1 describes a driver's cab for commercial vehicles, in particular for trucks, having a front section and two side walls in which is respectively provided a door beneath which is arranged a climb-in region with tread surfaces, wherein the climb-in regions are open to the front.

SUMMARY OF THE INVENTION

This section provides a general summary of the disclosure, and is not a comprehensive disclosure of its full scope or all of its features.

The object of the invention is to provide an apparatus for improving the aerodynamics of a commercial vehicle having a cab with footboards, which apparatus provides an optimal air path at the front wheel of the commercial vehicle.

The object is achieved with an apparatus for improving the aerodynamics of a commercial vehicle having a cab with doors and below-situated footboards for climbing in and out, and having a front panel in which air inlets are present, wherein the air inlets are connected, via air-conducting devices in or on the panel, to the front wheel case of the commercial vehicle and to an air outlet, wherein the at least one footboard of the cab can be folded away and has at least one through-flow region in the vehicle longitudinal direction.

With this embodiment, the cw-value of the commercial vehicle is improved and the extent of the turbulences markedly reduced.

For this it is necessary that the at least one footboard, in the folded-away state, fits into a set-back region of the panel. Only in this way are protruding components, and thereby induced air swirls, able to be avoided.

It is here advantageous that the at least one footboard, in the folded-away state, constitutes a continuation of the outer contour of the vehicle or panel.

It is of advantage that the at least one through-flow region extends along the vehicle longitudinal axis.

In order to use as much inflowing air as possible, it makes sense for the air inlets to be placed in the panel of the commercial vehicle in the XZ-plane.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DESCRIPTION OF THE INVENTION

Figure 1:
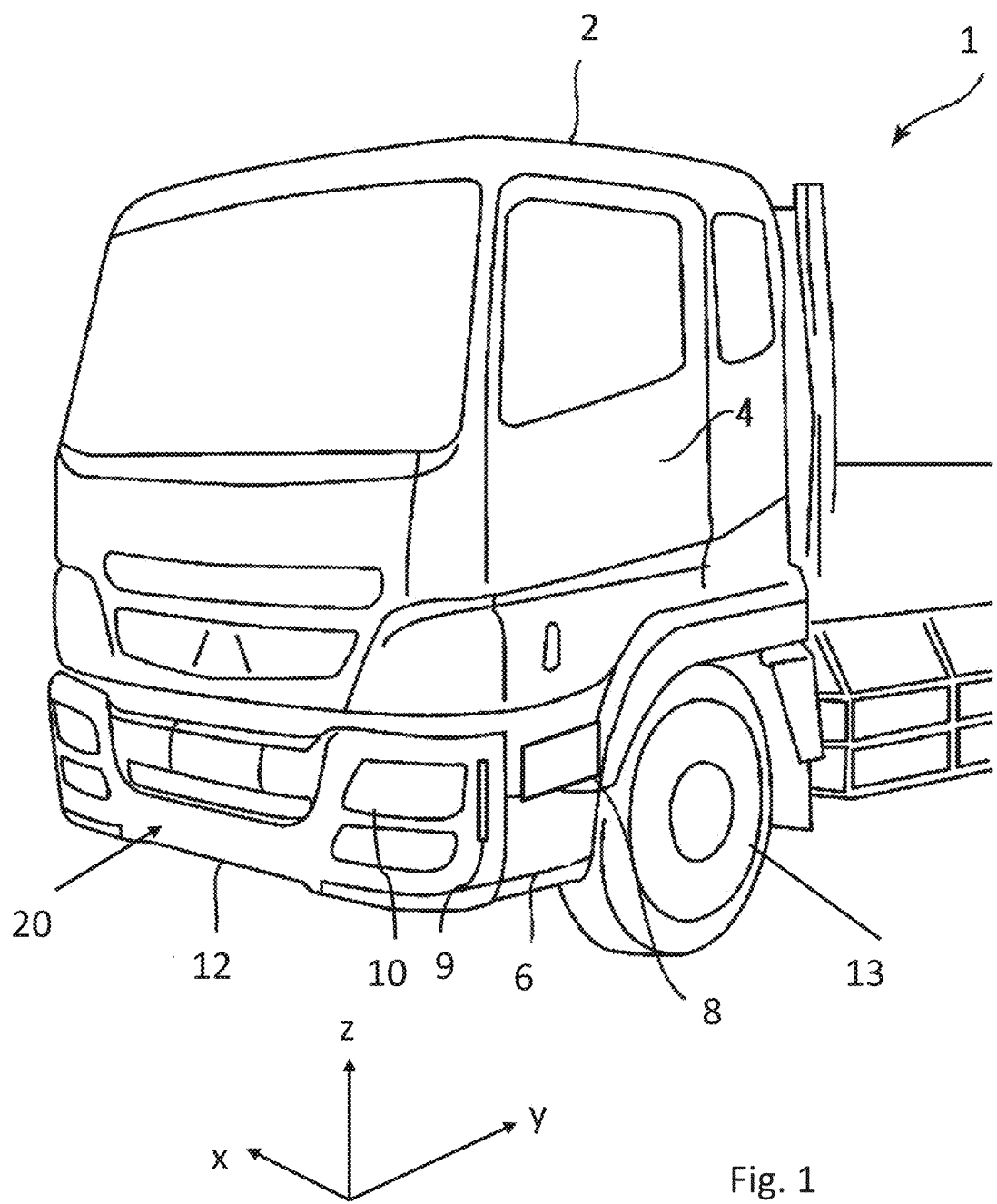
FIG. 1 shows a schematic representation of a commercial vehicle.

FIG. 1 shows by way of example a commercial vehicle, in this case a tractor unit 1, having a cab 2. The cab has externally visible panels, which are formed, for instance, inter alia, by a bumper 12 and by mudguards 6. By front panel 20 are understood all components of the front and sides of the vehicle which are fitted on the body shell.

The cab 2 has side doors 4. In order to get into the vehicle, footboards 8 are provided in the front panel 20.

Embedded in the front panel 20 of the cab 2 are front headlamps 10. In order to attain the flow around the front wheel 13, in the panel 20 are made air inlets 9, into which the incident air infiltrates during running of the vehicle. In FIG. 1 can be seen, by way of example, an air inlet which extends close to the front headlamps 10.

Such an air inlet 9 would extend symmetrically also on the other side of the vehicle next to the headlamps. The air inlet 9 can have different sizes and, in terms of layout, is optimized to the air flow that is to be obtained.

In principle, the air inlets 9 should be located in the front region in the X-Z plane in order to use the incident air as efficiently as possible for improving the aerodynamics.

Figure 2:
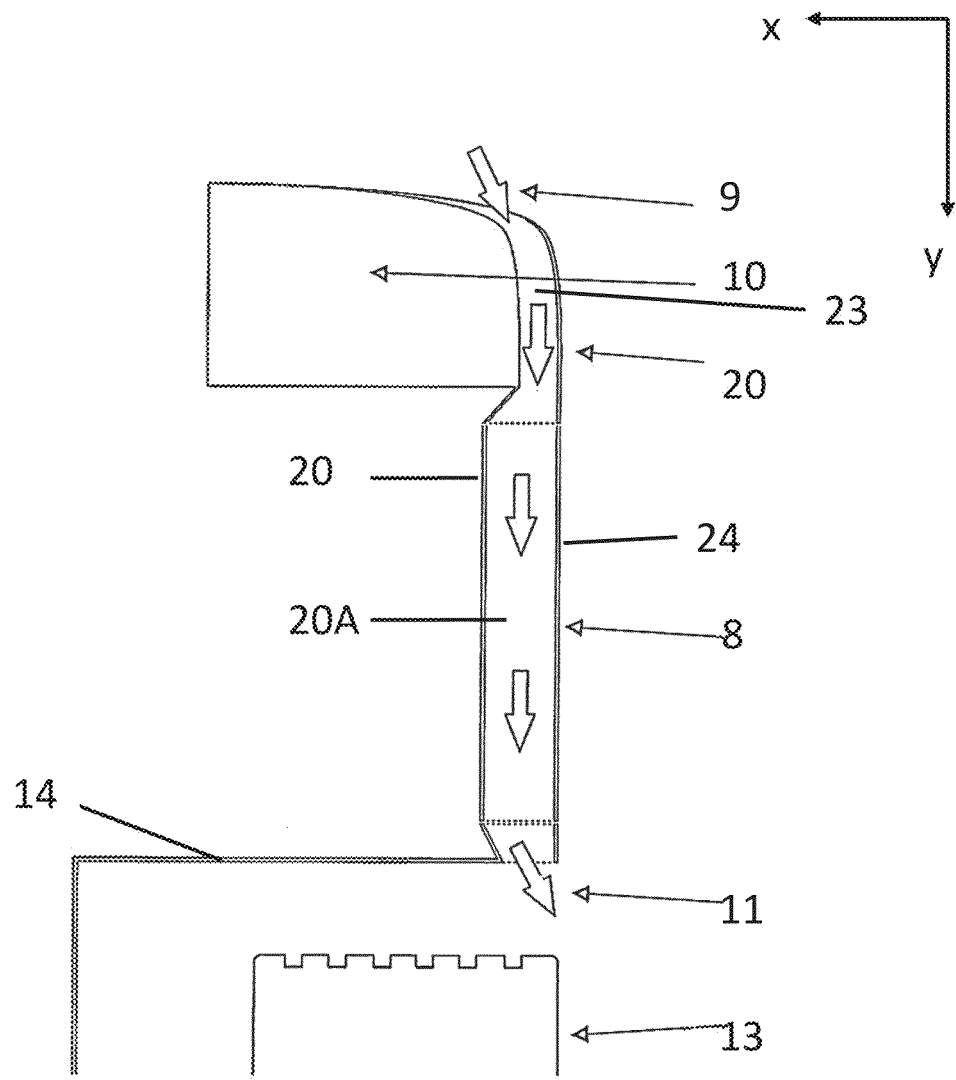
FIG. 2 shows a sectional image through the apparatus according to the invention.

In FIG. 2 is shown, in a section along the vehicle longitudinal direction Y, how the inflowing air is distributed. Located next to the front headlamp 10, in a part of the panel 20, is an air inlet 9. The panel 20 has an inner structure in the form of an air duct 23 and, in the region of the side door 4, which in this drawing extends out of the plane of the paper, the panel 20 exhibits a region 20A, which is set back in the X-direction. The outer contour 24 has a continuous path without interstices and gaps, so that small turbulences are generated. In this region 20A, the footboards 8 are configured. Via an air outlet 11 located in the region of a wheel case 14, the air flows in the direction of the wheel 13.

Figure 3:
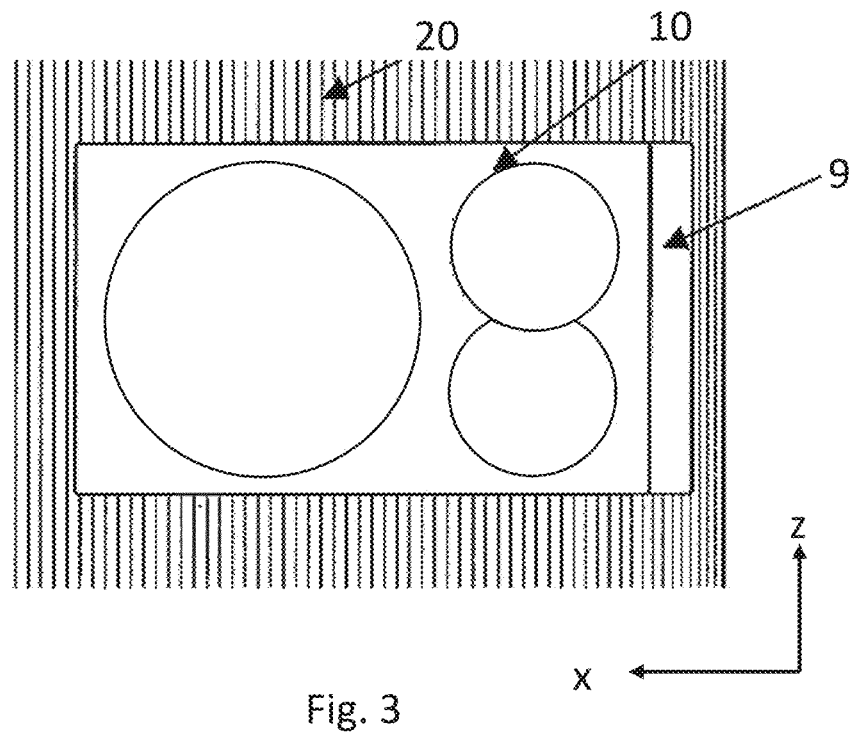
FIG. 3 shows a view in the front region of the commercial vehicle.

In FIG. 3, the front headlamp 10 in the panel 20 is represented schematically. In this example, the air inlet 9 extends along the entire structural height of the front headlamp.

Figure 4:
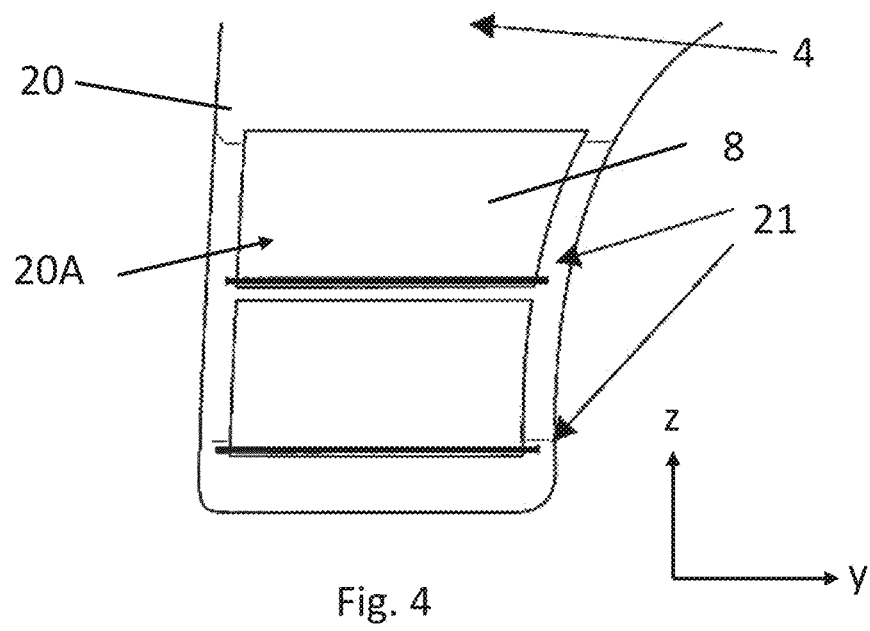
FIG. 4 shows a detail from the side region of the commercial vehicle.

In FIG. 4 can be seen, in a view onto the side region of the cab 2, how said sad side region extends beneath the side door 4. This concerns that region 20A of the front panel 20 that is set back inwards from the outer contour 24. In this illustrative embodiment can be seen, in sketch form, two footboards 8, and axles 21 to which these footboards 8 are attached pivotably about the vehicle longitudinal axis y.

Figure 5:
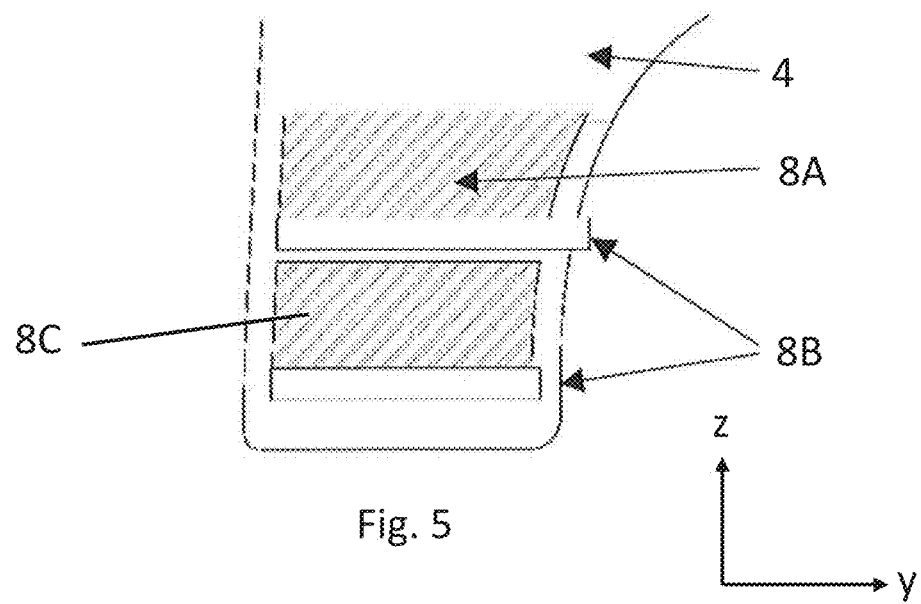
FIG. 5 shows a view of the side region of the commercial vehicle with footboards.

In FIG. 5, the embodiment is represented once again. The footboard 8A applied to the front panel 20 can be seen, as well as, schematically, the view onto the end face of the opened-out footboard 8B. In the folded-away state of the footboard 8A, the structured tread surface 8C of the footboards 8 can be seen.

Figure 6:
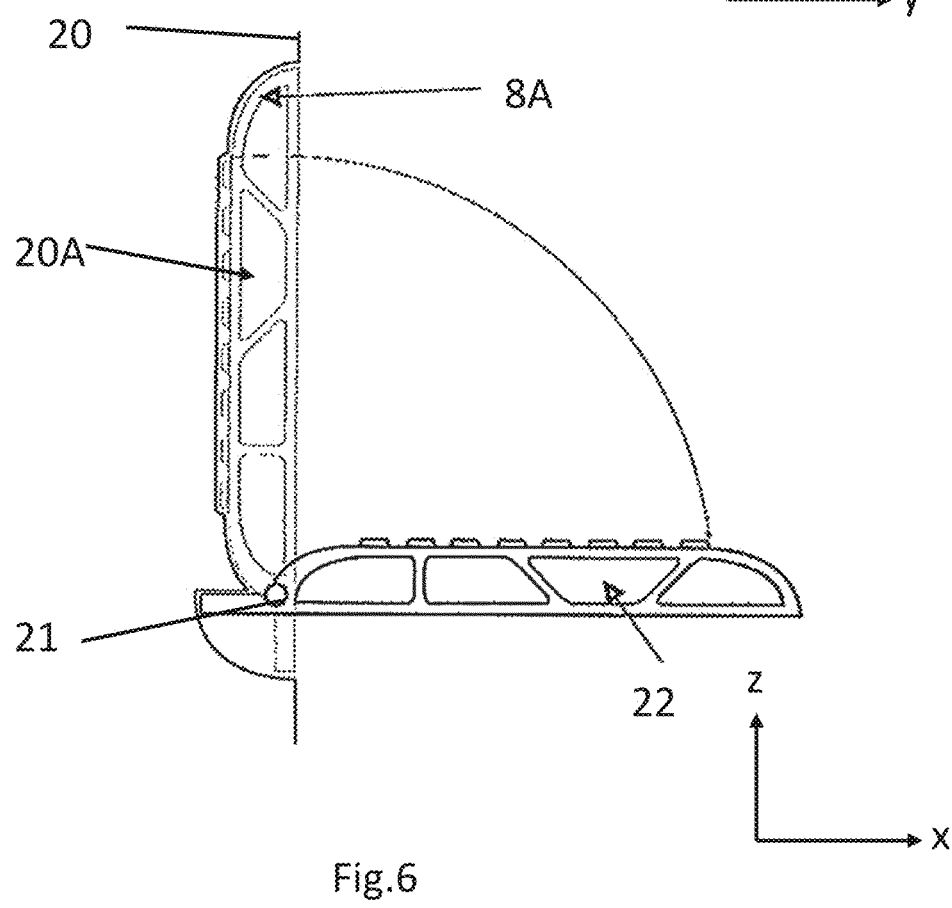
FIG. 6 shows a first embodiment of the pivotable footboards.
Figure 7:
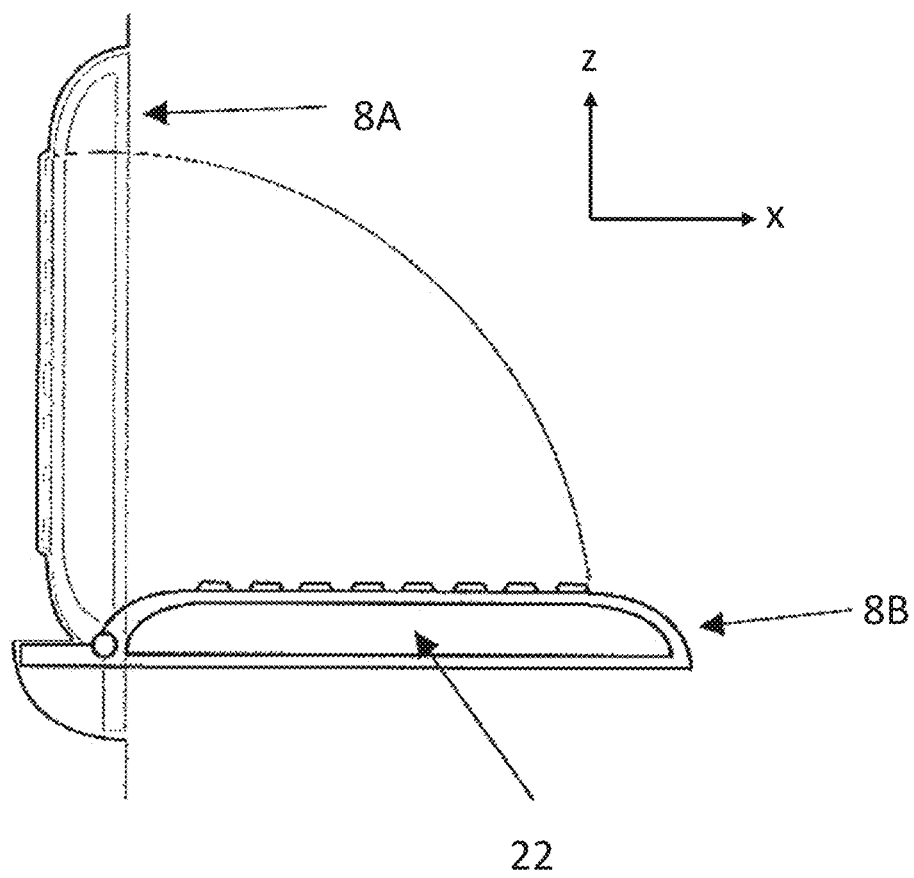
FIG. 7 shows a second embodiment.

In FIGS. 6 and 7, two illustrative embodiments of the pivotable footboards 8 are represented. In the folded-away state 8A, the footboard disappears fully into the set-back region 20 A of the panel 20. By pivoting about the axle 21, the footboard 8 is pivoted perpendicular to the vehicle and to the front panel 20 and can be used as a climb-up aid. The footboard here has either a single or a plurality of through-flow region(s) 22. In the illustrative embodiment of FIG. 6, the footboard 8 is formed by a honeycomb structure or lattice structure. It exhibits a multiplicity of honeycomb cells, which serve as through-flow regions 22.

By contrast, in the illustrative embodiment of FIG. 7, the through-flow region is the entire inner region of the hollow-made footboard 8.

In the folded-away state of the footboard 8A, the through-flow regions serve to ensure that the airflow, as indicated in FIG. 2 by the arrows, can flow in a problem-free manner through the footboard.

Depending on the structural arrangement, a footboard or a plurality of footboards are provided. The footboards 8 have an outer contour, which blends harmoniously into the set-back region 20 A, wherein the outer contour 24 of the vehicle along the panel and the footboards is realized without offsets.

The through-flow regions 22 extend along the vehicle longitudinal axis Y and the entire structural length of the footboard 8.

REFERENCE SYMBOL LIST 1 tractor unit
2 cab
3 side door
6 mudguard
8 footboard
8A footboard folded away
8B footboard opened out
8C tread surface
9 air inlet
0 headlamp
11 air outlet
12 bumper
13 wheel
14 wheel case
15 front panel
21 axle
22 through-flow region
23 air-conducting device
24 outercontour
20A set-back region

The invention claimed is:

1. An apparatus for improving the aerodynamics of a commercial vehicle having a cab with doors and at least one footboard for assisting an operator in climbing in and out of the cab, and having a front panel defining at least one air inlet, wherein the at least one air inlet is fluidly connected to at least one air outlet at a front wheel case, wherein the at least one footboard of the cab can be folded into a folded-away state, and wherein the at least one footboard has at least one through-flow region in a longitudinal direction of the vehicle which fluidly connects the at least one air inlet to the at least one air outlet.

2. The apparatus according to claim 1, wherein the at least one footboard, in the folded-away state, fits into a set-back region of the front panel.

3. Apparatus according to claim 1, wherein the at least one through-flow region extends in the longitudinal direction.

4. Apparatus according to claim 1, wherein the at least one air inlet is defined by the front panel of the commercial vehicle along a plane defined at a front of the vehicle.

5. An apparatus according to claim 1, wherein an outer contour of the at least one footboard constitutes a continuation of an outer contour of the vehicle or front panel.

6. An apparatus for improving the aerodynamics of a commercial vehicle having a cab with doors and at least one footboard for assisting an operator in climbing in and out of the cab, and having a front panel defining at least one air inlet, wherein the at least one air inlet is fluidly connected to at least one air outlet at a front wheel case, wherein the at least one footboard of the cab can be folded into a folded-away state, and wherein the at least one footboard has at least one through-flow region in a longitudinal direction of the vehicle, and wherein an outer contour of the at least one footboard constitutes in a continuation of an outer contour of the vehicle or front panel.

7. The apparatus according to claim 6, wherein the at least one footboard, in the folded-away state, fits into a set-back region of the front panel.

8. The apparatus according to claim 6, wherein the flow-through region fluidly connects the at least one air inlet to the at least one air outlet.

9. Apparatus according to claim 6, wherein the at least one air inlet is defined by the front panel of the commercial vehicle along a plane defined at a front of the vehicle.

10. A commercial vehicle, comprising:
- a cab with doors and at least one footboard for assisting an operator in climbing in and out of the cab;
- a front panel defining at least one air inlet;
- a front wheel case defining at least one air outlet;
- at least one air duct fluidly connecting the at least one air inlet to the at least one air outlet;
- the at least one footboard being foldable into a folded-away state; and
- the at least one footboard defining a through-flow region in a longitudinal direction of the vehicle fluidly connecting the at least one air inlet to the at least one air outlet while in the folded-away state.

11. A commercial vehicle according to claim 10, wherein an outer contour of the at least one footboard constitutes a continuation of an outer contour of the front panel while the at least one footboard is in the folded-away state.

12. The commercial vehicle according to claim 10, wherein the at least one footboard fits into a set-back region of the front panel while in the folded-away state.

13. The commercial vehicle according to claim 10, wherein the at least one air inlet is defined by the front panel of the commercial vehicle along a plane defined at a front of the vehicle.

* * * * *